United States Patent
Banziger et al.

(10) Patent No.: US 8,339,002 B2
(45) Date of Patent: Dec. 25, 2012

(54) END WINDING FOR AN ELECTRICAL MACHINE, AND METHOD FOR ITS PRODUCTION

(75) Inventors: Matthias Banziger, Fislisbach (CH); Daniel Hediger, Othmarsingen (CH)

(73) Assignee: ALSTOM Technology Ltd, Baden (CH)

( * ) Notice: Subject to any disclaimer, the term of this patent is extended or adjusted under 35 U.S.C. 154(b) by 298 days.

(21) Appl. No.: 12/776,960

(22) Filed: May 10, 2010

(65) Prior Publication Data
US 2010/0289355 A1 Nov. 18, 2010

(30) Foreign Application Priority Data
May 13, 2009 (DE) .......................... 10 2009 021 063

(51) Int. Cl.
*H02K 15/00* (2006.01)
(52) U.S. Cl. .......................................... 310/71; 310/260
(58) Field of Classification Search .................... 310/71, 310/260
See application file for complete search history.

(56) References Cited

U.S. PATENT DOCUMENTS

| | | | | |
|---|---|---|---|---|
| 2,828,428 A * | 3/1958 | Baudry et al. ................... | 310/64 |
| 4,199,700 A * | 4/1980 | Daugherty et al. ............ | 310/71 |
| 4,254,352 A * | 3/1981 | Fidei et al. ....................... | 310/71 |
| 4,629,917 A * | 12/1986 | Brem ............................... | 310/59 |
| 4,806,807 A * | 2/1989 | Levino ............................. | 310/71 |
| 5,900,687 A * | 5/1999 | Kondo et al. ..................... | 310/71 |
| 7,262,529 B2 * | 8/2007 | Klappenbach et al. .......... | 310/71 |
| 7,368,845 B2 * | 5/2008 | Baenziger et al. ............. | 310/260 |
| 8,074,343 B2 * | 12/2011 | Hediger et al. .................. | 29/596 |
| 2009/0039720 A1 * | 2/2009 | Tsukashima et al. ........... | 310/71 |

FOREIGN PATENT DOCUMENTS

| | | |
|---|---|---|
| DE | 102004016454 A1 | 10/2005 |
| EP | 1279838 A1 | 1/2003 |
| WO | 2008138704 A2 | 11/2008 |

* cited by examiner

*Primary Examiner* — Tran Nguyen
(74) *Attorney, Agent, or Firm* — Volpe and Koenig, P.C.

(57) ABSTRACT

An end winding is described for a stator of an electrical machine. The end winding includes at least two round connectors via which the current is passed out from the winding bars of the stator, as well as a plurality of supporting brackets, via which the end winding is attached to the stator. The end winding has at least two round connectors having a radial section at whose end a phase connection block is in each case arranged. At least two phase connection blocks of one phase are arranged alongside one another in the circumferential direction. The adjacent phase connection blocks are connected via at least one pin element and is mounted at least partially integrally in recesses in the mutually facing side surfaces of the phase connection blocks. A method for fitting an end winding such as this is also described.

20 Claims, 2 Drawing Sheets

END WINDING FOR AN ELECTRICAL MACHINE, AND METHOD FOR ITS PRODUCTION

FIELD OF INVENTION

The present invention relates to an end winding for an electrical machine having a rotor and a stator, in particular to an electric motor or a generator, preferably in a power station. The invention also relates to a method for fitting an end winding.

BACKGROUND

In large machines of this type, in particular for electricity production in a power station, the stator has a stator winding which is formed by a plurality of winding bars. These winding bars, which are generally in the form of so-called Roebel bars, in this case extend in the axial direction in a stator core. The ends of the winding bars are passed out of the stator core at least on one axial end face of this stator core. The winding bar ends which are passed out are normally bent in the radial direction and in the circumferential direction, and are arranged such that they form a frustoconical or funnel-shaped end winding on the core end face, the diameter of which end winding increases as the distance from the core end face increases.

The stator winding of the electrical machine is provided with a plurality of connecting terminals, in order to allow electrical power to be fed into the stator winding and/or to be fed out of the stator winding, depending on whether the electrical machine is designed and/or is being operated as an electric motor or as a generator. For this purpose, selected winding bars, so-called phase winding bars, must be connected to these connecting terminals.

By way of example, this can be done in the end winding by phase connector bars, so-called round connectors, which each connect one of the phase winding bars in the area of the core end face to one of the connecting terminals.

In general, the phase connector bars extend between their ends in the form of an annular segment in the circumferential direction of the stator, in which case they are supported radially internally on one or more supports, normally in the form of supporting brackets, which are arranged distributed in the circumferential direction in the area of the core end face. The round connectors are arranged on the outer face of these supporting brackets and are frequently attached to the supporting brackets. In general, a plurality of round connectors are located axially (with respect to the stator axis) one behind the other between axial stops on the supporting brackets. Spacers are expediently arranged in each case between adjacent round connectors in the area of the supports, on which spacers the round connectors come to rest axially. The sizes of the spacers are in this case expediently adapted such that they result in an interference fit, after being fitted in the axial direction, for the round connectors which are arranged between the axial stops. This results in the round connectors being effectively fixed on the supporting brackets, as is necessary because of the loads which occur during operation of the electrical machine.

The round connectors are normally provided with insulation, in general a synthetic resin, on their outer face. During curing of the resin and because of the heating and vibrations which occur during operation of the electrical machines, seating phenomena can occur, in the course of which the insulation on the round connectors can flex slightly in the axial direction. This results in a major decrease in the axial pressure in the interference fit between the axial stops on the supports, which can lead to the axial holding forces being reduced during continuous operation of the respective machine. Designs and improvements such as these relating to the configuration of the spacers and the retention of the round connectors are disclosed, for example, in DE 102004016454.

WO 2008/138704 discloses that it is possible to attach the round connectors to the supporting brackets by knurling and an entire supporting basket, formed from supporting brackets which are distributed over the circumference and are connected by an outer and an inner supporting ring, and the round connectors which are arranged on the outer face of the supporting brackets and are attached thereto being introduced in their entirety into an impregnation agent bath.

SUMMARY

The present disclosure is directed to an end winding for a stator of an electrical machine. The end winding includes at least two round connectors via which the current is passed out from the winding bars of the stator, and a plurality of supporting brackets, via which the end winding is attached to the stator. The at least two round connectors have a radial section at whose end a phase connection block is in each case arranged. At least two phase connection blocks of one phase are arranged alongside one another in the circumferential direction. The adjacent phase connection blocks are connected via at least one pin element and is mounted at least partially integrally in recesses in the mutually facing side surfaces of the phase connection blocks.

In another aspect, the disclosure is directed to a method for fitting the end winding described above. The method includes pushing the pin element into the recess in the first phase connection block and pushing the recess in the second adjacent phase connection block onto a part of the at least one pin element that projects out of the first phase connection block. The method also includes arranging, aligning and fixing the round connectors, in a final spatial arrangement. A connection material for integral connection of the pin element is either introduced into the recesses before the at least one pin element is pushed in or is applied to the pin element. Alternately/additionally, a connection material for integral connection of the pin element is introduced via connecting channels which open into a bottom area of the recesses, which are preferably in the form of blind holes.

BRIEF DESCRIPTION OF THE DRAWINGS

Preferred embodiments of the invention will be described in the following text with reference to the drawings, which are intended to be used only for explanatory purposes and should not be interpreted as being restrictive. In the drawing.

DETAILED DESCRIPTION OF THE PREFERRED EMBODIMENTS

Introduction to the Embodiments

Figure 2:
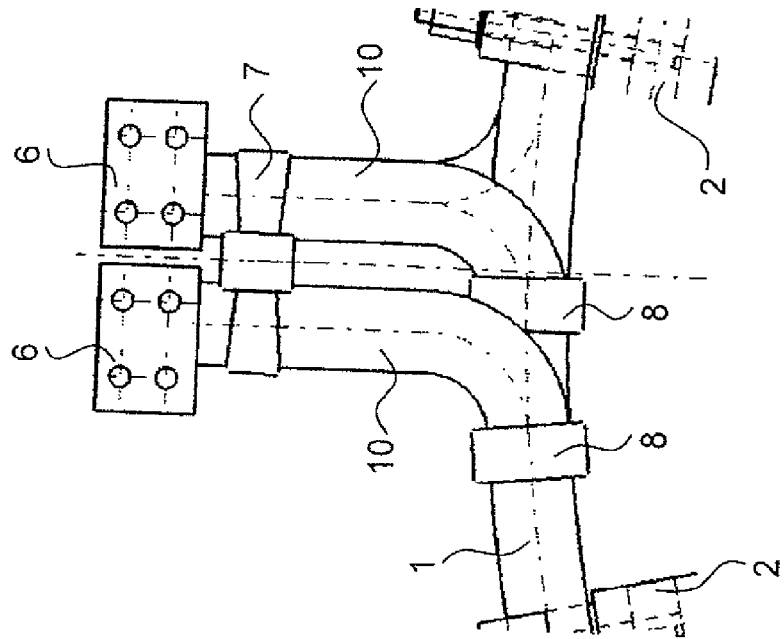
FIG. 2 shows an axial view of a pair of phase connection blocks and their connection to the round connectors.

One object of the invention, inter alia, is to provide an improved end winding for an electrical machine, in which case the improvement is in particular intended to comprise the end winding being designed to be more robust and nevertheless such that it can be fitted easily.

In a corresponding manner, the invention relates to an end winding for a stator of an electrical machine, in which the end winding comprises at least two round connectors via which the current is passed out from the winding bars of the stator. Typically, the end winding comprises a multiplicity of round connectors, in which case these are combined to form connections, corresponding to the number of the phases. In addition, the end winding comprises a plurality of supporting brackets, via which the end winding is attached to the stator, and the brackets together with round connectors form an actual supporting basket. In this case, the round connectors typically have a radial section, at whose end a phase connection block is in each case arranged. The phase connection block is typically a metal block in the form of a cube or cuboid, in which the round connector is incorporated. At least two phase connection blocks of one phase in the case of the end winding are arranged alongside one another in the circumferential direction and, according to the invention, the adjacent phase connection blocks are furthermore connected via at least one pin element and is mounted at least partially integrally in recesses in the mutually facing side surfaces of the phase connection blocks.

An element such as this which is in the form of a pin may be provided, or otherwise a plurality of such elements which are in the form of pins and are arranged parallel are provided.

In many generators, the round connectors, which run parallel, and the corresponding flexible connections are as far as possible passed separately through the housing as far as the bushings. The parallel paths are joined together to form a single path only directly close to the bushing through the housing. Preferably, there is one phase connection block for each round connector, although alternatively it is also possible to pass two or more round connectors to a single phase connection block.

Virtually all of the round connectors have a sufficiently long circumferential section in order to be attached to a supporting bracket at least one point. However, there is or are frequently also one or a small number of round connectors which, for geometric reasons are not attached to any supporting bracket. In the case of a stator with a diameter of 3 m, round connectors can in any case be attached such that 50 cm-70 cm between the last attachment and the end of the round connector are not directly attached in the case of the phase connection block 50, but are fixed between the round connectors only via spacers or connection elements. There are also round connectors which are attached to a supporting bracket at only one point. These spacers or connection elements, which can also be arranged shortly before the phase connection blocks on the radial sections, are not well-defined and robust connections. Specifically, and typically, the spacers, the connection elements and the insulation material on the round connectors are materials which can flex under the influence of heat. Therefore, particularly when the temperature rises during operation, the round connectors will in some circumstances no longer be adequately fixed in their spatial orientation. In fact, this results in the round connectors being able to move in the axial, radial and tangential directions.

Because of this attachment characteristic, it is possible for rocking movements of the round connectors to be formed on the attachment, in which case the natural frequencies may be very low, because of the low stiffness. Corresponding friction and wearing of the insulation, and increasing weakening of the attachment and of the solder points are correspondingly problematic, but surprisingly can be largely avoided if, as proposed according to the invention, the phase connection blocks which are arranged alongside one another circumferentially are stiffly connected to one another.

The proposed attachment of the two phase connection blocks is in this case quite deliberately designed such that a first provisional relative orientation is preset when the connection pin is pushed into the recesses in the two adjacent blocks. The connection pin can then be rotated and moved linearly and, in a first fitting phase, it is correspondingly possible to then also align the round connectors and to fix them as far as possible in the final desired position.

Correspondingly, it is also preferable for neither the inner surface of the recesses nor the cylindrical outer surface of the connection pin to have a thread.

Only after this definitive orientation of the round connectors has been achieved and fixed is the connection of the adjacent phase connection blocks fixed in a second step, by forming the integral connection. This is typically done by introducing an appropriate material (in the sense of an adhesive).

In a first preferred embodiment of the invention, the pin element is in the form of a connection pin with a circular-cylindrical outer surface, and the recesses are in the form of cylindrical blind holes, and in that the attachment of the connection pin is essentially exclusively integral. This embodiment provides the mobility, as mentioned above, in the circumferential direction and/or tangential direction, as well as partially in the radial and/or axial direction, thus allowing the round connectors to be aligned before the integral attachment. However, the connection pin may also have (axial) grooves and/or projections in the circumferential surface which, where appropriate correspond to corresponding complementary structures in the inner surface of the recesses (lock-and-key principle). The cross-sectional surface of the connection pin may correspondingly be circular, oval or may have some other round form, or else it may be triangular, rectangular, square, hexagonal or in general polygonal with equal or different side lengths, and in which case the corners may be rounded.

In a further preferred embodiment, the end winding is designed for three phases and has three or six pairs of phase connection blocks which are connected to one another via in each case one pin element. Six pairs of phase connection blocks are preferably provided, and in each case two pairs of phase connection blocks are provided per phase and are preferably arranged one behind the other in the axial direction.

The preferred, circular-cylindrical element, which is in the form of a pin, may have depressions and/or grooves, for example a plurality of grooves in the form of a star, on the end face. This preferably in combination and/or in conjunction with depressions and/or grooves which are arranged in the circumferential surface of the element and in particular preferably have a length, starting on the end face in the axial direction of the pin element, which is shorter, preferably at least 2 mm to 5 mm shorter, than the depth of the recess. The grooves may be arranged uniformly or additionally in/on the internal area of the recess. These grooves are used to accommodate the material for forming the integral connection, and in order to wet as large a surface area as possible therewith.

The pin element is preferably formed integrally.

Furthermore, the pin element is preferably based on a metallic material, an insulating material, or a combination of such materials.

By way of example, the pin element may be composed of ceramic or of plastic, or may have a surface coating of a material such as this, and in particular it may be entirely or partially composed of glass-fiber-reinforced plastic.

In a preferred embodiment, the pin element is in the form of a connection pin with a circular-cylindrical outer surface, and the recesses are in the form of cylindrical blind holes.

In general, it has been found to be advantageous for the typical large configuration of generators for electricity generation for the external diameter of the connection pin to be less in the range from 0.01 mm-2 mm than the internal diameter of the recess, thus resulting in sufficient play to allow the abovementioned alignment before the production of the integral connection.

It is furthermore preferable for the recesses to have a penetration depth for the connection pin in the range from 5 mm-40 mm, preferably in the range from 10 mm-30 mm.

It is furthermore preferable for the connection pin to have a length in the range from 10 mm-80 mm, preferably in the range from 20 mm-50 mm.

Furthermore, it is preferable for the connection pin to have a diameter in the range from 5 mm-60 mm, preferably in the range from 20 mm-40 mm.

In a further preferred embodiment, the recesses are in the form of blind holes in the phase connection blocks, and in that an externally accessible connecting channel opens into the bottom area of the blind holes. This connecting channel makes it possible to introduce material from the outside in order to produce the integral connection in the second fitting step.

In this case, the bottom area preferably has an accommodation area into which the pin element does not project, even when it is being pushed completely into the recess. By way of example, this accommodation area may be in the form of a conically tapering section on the bottom of the blind hole, although it may also be in the form of grooves or other depressions. The accommodation area is used to accommodate and/or distribute the material for production of the integral connection, and is advantageous in particular in combination with grooves and/or depressions in the connection pin, and/or the further walls of the recess.

As is also preferable, the connecting channel may in this case have means with the aid of which an introduction aid (for example a flexible tube for injection) for the material for the interlocking attachment can be attached to the respective phase connection block for the attachment of the pin element. In this case, the means may preferably be an internal thread which is arranged in the inner wall of the connecting channel.

The pin element is preferably mounted in the recesses with the assistance of a curing plastic material, wherein the curing plastic material is preferably a cold-curing epoxy resin, or an epoxy resin which cures under the influence of heat.

In addition, according to a further preferred embodiment, the radial sections of round connectors which are each guided with respect to phase connection blocks which are arranged adjacent, can be connected via at least one connection element. The connection element may preferably be windings composed of knurling and/or strips, in particular preferably composed of glass-fiber-reinforced plastic material. This makes it possible to further stabilize the round connectors.

At least one connection pin is arranged for connection of two adjacent phase connection blocks, and its major axis is arranged essentially tangentially to the circumference of the stator.

Furthermore, the present invention relates to a method for fitting an end winding, as has been described above. In the method, a pin element is preferably pushed into the recess in the first phase connection block, and in that the recess in the second adjacent phase connection block is then pushed onto that part of this pin element that projects out of the first phase connection block, in that the round connections are arranged, aligned and fixed in their final spatial arrangement. In this case, a connection material for integral connection of the elements which are in the form of pins is either introduced into the recesses before the element is pushed in or is applied to the element and then cured (preferably under the influence of heat), and/or a connection material for integral connection of the elements which are in the form of pins is introduced via connecting channels which open into the bottom area of the recesses, which are preferably in the form of blind holes.

In a further preferred embodiment of the method, the bottom area of the blind holes has an accommodation area into which the pin element does not project, even when it has been pushed completely into the recess, and in that this accommodation area as well as grooves, which may be arranged in the pin element and/or may be arranged in the inner surface of the recess, and/or depressions are essentially filled with the connection material.

In order to carry out the method, the connection material can preferably be a plastic material, preferably a curing plastic material, and in particular preferably a cold-curing epoxy resin.

Further exemplary embodiments are described in the dependent claims.

DETAILED DESCRIPTION

An electrical machine comprises at least one stator and one rotor which is mounted in the stator such that it can rotate. By way of example, the electrical machine is an electric motor and/or a generator, in particular an alternating-current machine. The electrical machines considered here are designed for relatively high rating and are accordingly of relatively large size. One preferred application of machines such as these is, for example, for electricity production in a power station.

The stator has a stator core and a stator winding. This stator winding is formed from a multiplicity of winding bars which extend in the axial direction in the stator core, that is to say for example in FIG. 1 at right angles to the plane of the drawing, and therefore parallel to the rotation axis of the rotor. The winding bars, which in particular may be in the form of Roebel bars, are not illustrated in FIG. 1.

Figure 1:
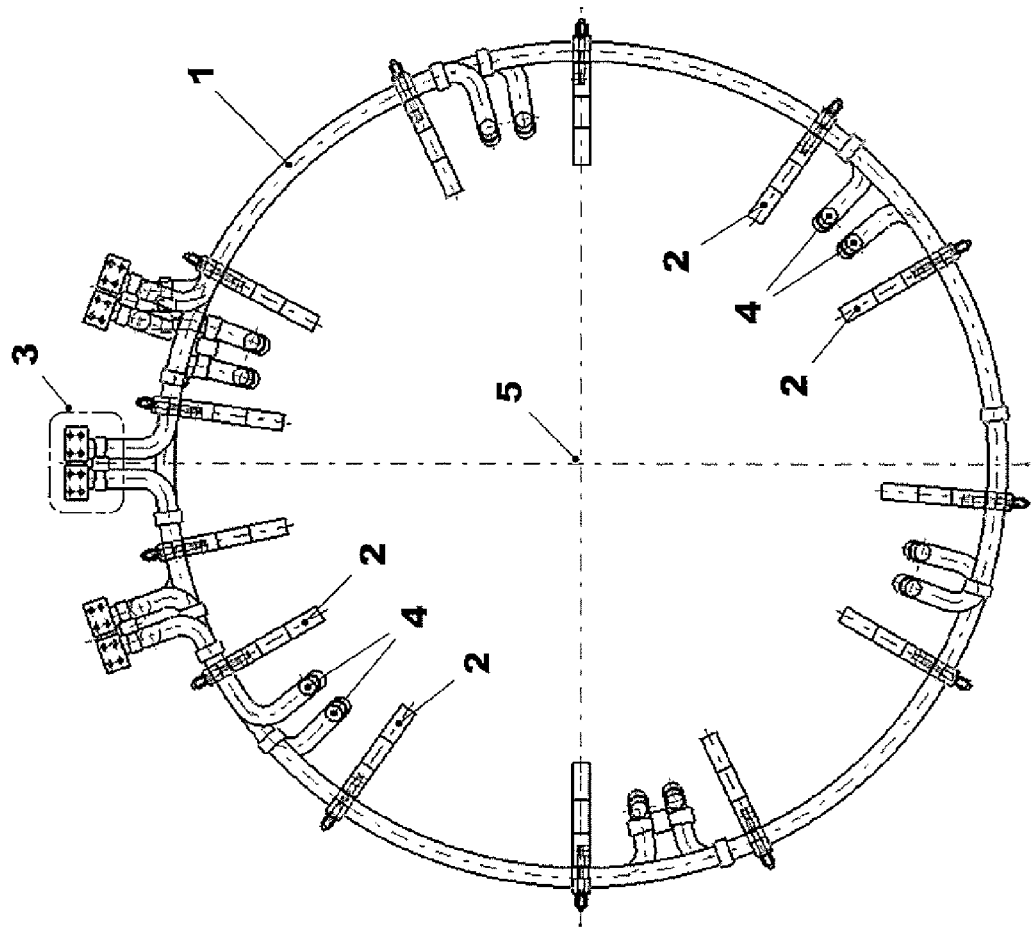
FIG. 1 shows an axial view of a core end face of parts of a winding of a stator.

The ends of the winding bars are passed out of the stator core at least on one axial end face of the stator core, facing the viewer in FIG. 1. The ends of the winding bars which are passed out of the stator core are preferably bent and arranged such that they form an end winding, which is not illustrated here, on the core end face. In general, an end winding such as this is in the form of a truncated cone which widens as the axial distance from the core end face increases. Within the end winding, the winding bar ends are firmly connected to one another, as a result of which the end winding reacts like an arch to pressure forces which act radially from the outside inwards, and can dissipate the forces that occur, in the circumferential direction. At the same time, extremely high axial forces away from the core end face on the outer circumference of the end winding can thus be introduced into this end winding. This design makes it possible to prestress the winding bars in the stator core with high axial tension forces in order to make it possible to absorb the loads which occur during operation of the machine 1.

The stator winding is provided with a plurality of connecting terminals or connections 3 via which electrical power can be fed into the machine (in the case of an electric motor or in the case of an electric motor operating mode), or can be fed out from the machine (in the case of a generator or in the case of a generator operating mode). Only three such connections 3 can be seen in the illustration shown in FIG. 1, but a smaller or larger number of connecting terminals 3 may also be provided. The three connections 3 represent the three phases, which are typically referred to as r, y and b, of the current that is fed in or fed out.

Of the totality of all the winding bars, some selected winding bars, so-called "phase winding bars" are each electrically conductively connected to one of the connections 3. In this case, there are twelve such phase winding bars, which are tapped off. This connection is made in the area of the core end face, to be precise with the aid of round connectors 1. In this case, each (phase) bar which is provided for this purpose is electrically conductively connected at the respective end via a dedicated round connector 1 (specifically via a connection section 4) to the respective connection 3.

For each of the three connections 3 illustrated in FIG. 1, one round connector 1 in each case runs over a radial section 10 (cf. FIG. 2) to a phase connection block 6. Two phase connection blocks 6 for the same phase are in each case arranged closely alongside one another in the circumferential direction. Two pairs of such phase connection blocks are in each case arranged offset axially one behind the other with respect to the stator axis, that is to say there are a total of twelve phase connection blocks 6, of which only the front six can be seen in FIG. 1, and the rear six, are concealed. There are therefore a front pair of phase connection blocks 6 and a rear pair of phase connection blocks 6 for each connection 3.

By way of example, the round connectors 1 are in the form of hollow conductors, wherein the hollow conductors may have a circular, oval or otherwise differently rounded external cross section, or else a square or polygonal, for example rectangular, external cross section. The cavity in the interior may in turn be circular or polygonal, in which case a circular external cross section can also be combined with a square internal cross section.

Since the winding bars which are provided for connection to the connecting terminals 3 are arranged distributed in the circumferential direction along the core end face, and the connections 3 are expediently located in a restricted circumferential segment for better accessibility, the round connectors 1 have different extents in the circumferential direction, in order to bridge the different distances between the respective winding bars and the connections 3. As can clearly be seen in FIG. 1, most of the round connectors 1 are therefore in the form of an annular segment between their ends, and extend in the circumferential direction of the stator with respect to the rotation axis 5.

In general, flexible connections (fabric-like structures composed of electrically conductive material) follow radially outward for each of these connections, via which the electric current is then fed out via bushings through the housing. In this case, one or more such flexible connections may in each case be provided for each individual phase connection block 6. However, it is also possible to provide only one flexible connection in each case for the front and for the rear pair of phase connection blocks 6.

As has already been explained in the introduction, round connectors 1 which are arranged in this way and are connected to one another do not ensure sufficient stability of the round connectors 1, in particular when subjected to the influence of high temperature. In other words, the entire design of the end winding with the supporting basket is frequently not sufficiently robust.

This is the purpose of the invention, to be precise as will be explained in particular with reference to FIG. 3. The two phase connection blocks 6 which are arranged adjacent have two mutually facing side surfaces. Opposite holes are arranged or provided in these side surfaces. The holes are in the form of cylindrical holes and each have a truncated conical depression area 13 at the bottom. A connecting channel 14 in each case opens into this truncated conical depression area and is easily accessible from one exposed side surface of the phase connection block 6. The connecting channel 14 widens toward the end, and an internal thread 15 is also provided in this widened cylindrical area. The internal thread 15 is in this case designed such that it allows a flexible tube or a similar tool with an external thread to be firmly connected, in order to introduce a compound to produce an integral connection.

An integral connection pin 9, which is in the form of a circular cylinder, is now arranged in the two holes 12 and its axis runs essentially tangentially to the circumference of the stator. The connection pin 9 in this case penetrates into the hole in the respective phase connection block 6 to a depth t. A short distance in the range from 2 mm to 10 mm typically remains in between. This means that the two adjacent phase connection blocks do not touch, and the overall length of the connection pin 9 is preferably greater than twice the penetration t, thus predetermining a minimum distance between the two blocks 6.

The fitting procedure is now carried out by pushing a connection pin 9 such as this into a first phase connection block 6 and by then pushing the hole 12 in the second phase connection block 6 onto that end of the pin 9 which projects out of the first block 6. The connection which exists between the two phase connection blocks 6 in this phase is a connection with a certain amount of play, which means that the two blocks 6 can still be moved with respect to one another along the major axis of the connection element, and to a certain extent also in other directions, and that the two phase connection blocks 6 can be rotated with respect to one another about the major axis of the connection element.

This allows the further alignment tasks to be carried out on the round connectors 1 and, for example, also an additional connection element 7 to be provided which in this case, in this figure, is in the form of knurling composed of a glass-fiber-reinforced plastic with a central wrapping 11. The typical procedure is for all of the round connectors 1 now be to be aligned in this first fitting phase, for the corresponding additional fixings and impregnations to be carried out, and for the entire structure then to be cured, generally under the influence of heat.

In a next step, a cement compound is now injected through the two connecting channels 14 and in this case is preferably a cold-curing cement compound, for example based on an epoxy resin. This leads to the connection between the connection pin 9 and the two phase connection blocks 6 now being completely fixed and rigid. This is done precisely in that relative orientation state which is provided for the optimum alignment of the entire end winding. This ensures considerably greater stiffness which, in particular, is maintained even at high operating temperatures, and makes it possible to efficiently prevent fatigue phenomena as well as fractures at the solder points.

Figures 3, 4:
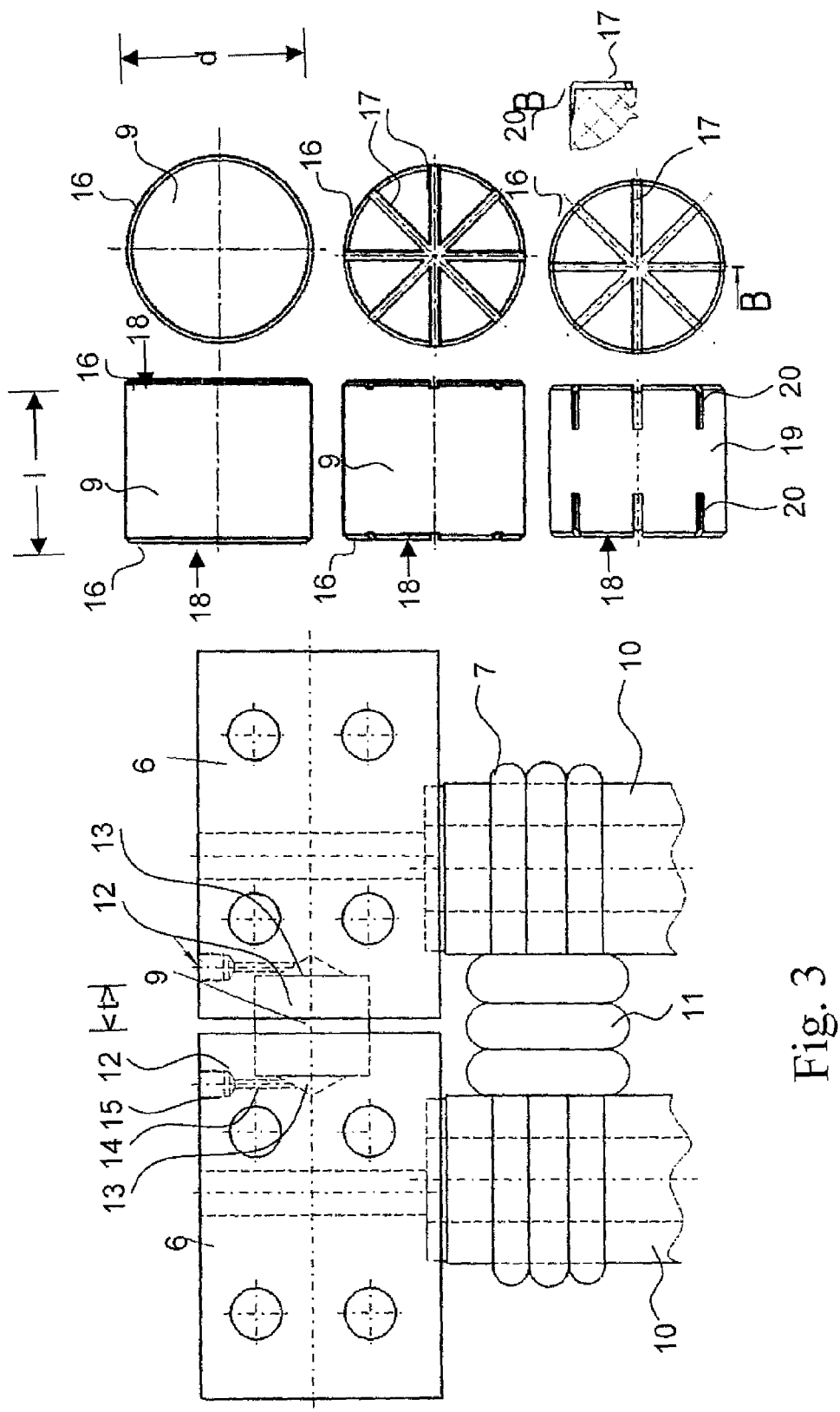
FIG. 3 shows an axial view of a pair of phase connection blocks which are connected to one another according to the invention.
FIG. 4 shows side views (on the left), views of the end face (in the center) and a section illustration along the line B (on the right) of a connection pin.

An explanation will now be provided, with reference to FIG. 4, as to how different refinements of the connection pin 9 are possible in order to allow the integral connection between the respective phase connection block 6 and the pin 9 to be configured optimally. The simplest design is shown at the top, and in this case the connection pin 9 is in the form of a simple circular cylinder. An incline or chamfer 16 is formed on the circumferential edge, in order to allow the pin 9 to be inserted into the recess 12 more easily.

A first improved variant is shown in the center. In this case, the end face 18 of the circular cylinder is provided with grooves 17 which are arranged in the form of a star. In particular in conjunction with the depression area 13, it is therefore possible to introduce the material for forming the integral connection very efficiently into these grooves 17, and a large surface area is available for this integral connection.

A more improved embodiment is shown at the bottom in FIG. 4. In this case, in addition to the grooves 17 which are in the form of a star, a groove 20 which extends partially in the axial direction is also provided in the circumferential surface at the end face, in each case at the outer end of the respective groove 17. This groove 20 makes it possible for the material for production of the integral connection not only to land in the depression area 13 but also in the grooves 17 and, in addition, in the circumferential area of the connection pin 9, as well.

Analogous groove-like depressions, may, of course, be provided on the inner surface of the recesses, possibly in conjunction with the grooves in the connection pin illustrated in FIG. 4, and in certain circumstances even in a coordinated manner with them.

LIST OF REFERENCE SYMBOLS

1 Round connectors, phase connection bars
2 Supporting bracket
3 Connection
4 Connection section, phase connection
5 Axis of the stator
6 Phase connection block
7, 8 Connection element/collar
9 Connection pin, pin element
10 Radial section of 1
11 Wrapping
12 Hole in 6
13 Depression area in 12
14 Connecting channel
15 Internal thread
16 Chamfer
17 Grooves in end face
18 End face of 9
19 Circumferential surface of 9
20 Groove in circumferential surface
l Length of 9
d Diameter of 9
t Depth of the hole in 6

What is claimed is:

1. An end winding for a stator of an electrical machine, the end winding comprising at least two round connectors wherein the current is passed out from the winding bars of the stator via said at least two round connectors, and a plurality of supporting brackets, wherein the end winding is attached to the stator by said plurality of supporting brackets; and, wherein the at least two round connectors have a radial section; a phase connection block arranged at an end of said radial section, and wherein at least two phase connection blocks of one phase are arranged adjacent one another in the circumferential direction, the adjacent phase connection blocks are connected via at least one pin element and said at least one pin element and is mounted at least partially integrally in recesses in the mutually facing side surfaces of the phase connection blocks.

2. The end winding as claimed in claim 1, wherein the pin element is in the form of a connection pin with a circular-cylindrical outer surface, and the recesses are in the form of cylindrical blind holes, and in that the attachment of the connection pin is essentially exclusively integral.

3. The end winding as claimed in claim 1, wherein the end winding is designed for three phases and has at least three pairs of phase connection blocks which are connected to one another via in each case one pin element, wherein six pairs of phase connection blocks are provided, and in each case two pairs of phase connection blocks are provided per phase and are arranged one behind the other in an axial direction.

4. The end winding as claimed in claim 1, wherein the pin element has at least one of depressions or grooves on the end face, in combination and in conjunction with at least one of depressions or grooves which are arranged in the circumferential surface and have a length, starting on the end face in the axial direction of the pin element, which is shorter than the depth of the recess.

5. The end winding as claimed in claim 1, wherein the pin element is formed integrally and is composed of a metallic material or an insulating material.

6. The end winding as claimed in claim 1, wherein the pin element is composed of plastic or glass-fiber-reinforced plastic.

7. The end winding as claimed in claim 1, wherein the pin element is in the form of a connection pin with a circular-cylindrical outer surface, and the recesses are in the form of cylindrical blind holes, wherein the external diameter of the connection pin is in the range from 0.01 mm to 2 mm less than the internal diameter of the recess, and wherein the recesses have a penetration depth for the connection pin in the range from 5 mm to 40 mm, or wherein the connection pin has a length in the range from 10 mm to 80 mm or has a diameter in the range from 5 mm to 60 mm.

8. The end winding as claimed in claim 1, wherein the recesses are in the form of blind holes in the phase connection blocks, and an externally accessible connecting channel opens into a bottom area of the blind holes, wherein, the bottom area has an accommodation area into which the pin element does not project, even when the pin element is being pushed completely into the recess.

9. The end winding as claimed in claim 8, wherein the connecting channel has means with the aid of which an introduction aid for the material for the interlocking attachment can be attached to the respective phase connection block for the attachment of the pin element, the means being an internal thread arranged in an inner wall of the connecting channel.

10. The end winding as claimed in claim 1, wherein the pin element is mounted in the recesses with the assistance of a curing plastic material.

11. The end winding as claimed in claim 1, wherein the radial sections of round connectors are each guided with respect to phase connection blocks, and are arranged adjacent one another, the radial sections of round connectors are connected via at least one connection element.

12. The end winding as claimed in claim 2, wherein at least one connection pin is arranged for connection of two adjacent phase connection blocks, and a major axis of the at least one connection pin is arranged essentially tangentially to the circumference of the stator.

13. A method for fitting an end winding, the end winding comprising at least two round connectors wherein the current is passed out from the winding bars of the stator via said at least two round connectors, and a plurality of supporting brackets, wherein the end winding is attached to the stator by said plurality of supporting brackets; and, wherein the at least two round connectors have a radial section; a phase connection block arranged at an end of said radial section, and wherein at least two phase connection blocks of one phase are arranged adjacent one another in the circumferential direction, the adjacent phase connection blocks are connected via at least one pin element and said at least one pin element is mounted at least partially integrally in recesses in the mutually facing side surfaces of the phase connection blocks, the method comprising:

pushing the at least one pin element into the recess in the first phase connection block, and pushing the recess in the second adjacent phase connection block onto a part of the at least one pin element that projects out of the first phase connection block, arranging, aligning and fixing the round connectors, in a final spatial arrangement, wherein a connection material for integral connection of the at least one pin element is either introduced into the recesses before the at least one pin element is pushed in or is applied to the at least one pin element, or a connection material for integral connection of the at least one pin element is introduced via connecting channels which open into a bottom area of the recesses, which are in the form of blind holes.

14. The method as clamed in claim 13, wherein the bottom area of the blind holes has an accommodation area into which the at least one pin element does not project, even when it has been pushed completely into the recess, and wherein the accommodation area, grooves arranged in the at least one pin element or arranged in the inner surface of the recess, or depressions are essentially filled with the connection material.

15. The method as claimed in claim 13, wherein the connection material is a plastic material.

16. The end winding as claimed in claim 1, wherein the pin element has grooves on the end face, in the form of a star, in combination and in conjunction with at least one of depressions or grooves which are arranged in the circumferential surface have a length, starting on the end face in the axial direction of the pin element, which is at least 2 mm to 5 mm shorter, than the depth of the recess.

17. The end winding as claimed in claim 1, wherein the pin element is in the form of a connection pin with a circular-cylindrical outer surface, and the recesses are in the form of cylindrical blind holes, wherein the external diameter of the connection pin is in the range from 0.01 mm to 2 mm less than the internal diameter of the recess, and wherein the recesses have a penetration depth for the connection pin in the range from 10 mm to 30 mm, or wherein the connection pin has a length in the range from 20 mm to 50 mm, or has a diameter in the range from 20 mm to 40 mm.

18. The end winding as claimed in claim 1, wherein the pin element is mounted in the recesses with the assistance of a cold curing epoxy resin.

19. The end winding as claimed in claim 1, wherein the radial sections of round connectors are each guided with respect to phase connection blocks, and are arranged adjacent one another, the radial sections of round connectors are connected via at least one connection element, wherein the at least one connection element comprises windings composed of glass-fiber-reinforced plastic material knurling or strips.

20. The method as claimed in claim 13, wherein the connection material is a cold-curing epoxy resin.

\* \* \* \* \*